(12) United States Patent
Villerup et al.

(10) Patent No.: US 11,982,564 B2
(45) Date of Patent: May 14, 2024

(54) METHOD AND A DEVICE FOR ESTIMATING WEIGHT OF FOOD OBJECTS

(71) Applicant: MAREL SALMON A/S, Stovring (DK)

(72) Inventors: Stefan Villerup, Aalborg (DK); Andreas Dam Lykkegard, Aalborg (DK)

(73) Assignee: MAREL SALMON A/S, Stovring (DK)

( * ) Notice: Subject to any disclaimer, the term of this patent is extended or adjusted under 35 U.S.C. 154(b) by 420 days.

(21) Appl. No.: 17/413,069

(22) PCT Filed: Dec. 12, 2019

(86) PCT No.: PCT/EP2019/084959
§ 371 (c)(1),
(2) Date: Jun. 11, 2021

(87) PCT Pub. No.: WO2020/120702
PCT Pub. Date: Jun. 18, 2020

(65) Prior Publication Data
US 2022/0026259 A1   Jan. 27, 2022

(30) Foreign Application Priority Data
Dec. 12, 2018   (EP) .................................. 18211923

(51) Int. Cl.
*G01G 9/00* (2006.01)
*G06N 3/02* (2006.01)
(Continued)

(52) U.S. Cl.
CPC ................ *G01G 9/00* (2013.01); *G06N 3/02* (2013.01); *G06T 7/0004* (2013.01); *G06T 7/40* (2013.01);
(Continued)

(58) Field of Classification Search
CPC ........... G01G 9/00; G06T 7/70; G06T 7/0004; G06T 7/40; G06T 2200/04;
(Continued)

(56) References Cited

U.S. PATENT DOCUMENTS 10,350,779 B2 * 7/2019 Seager ..................... B26D 7/00
2009/0137195 A1   5/2009 Bottemiller et al.
(Continued)

FOREIGN PATENT DOCUMENTS

EP            2029330 A1      3/2009
WO       2009138088 A1     11/2009

OTHER PUBLICATIONS

Search Report from corresponding European Application No. EP18211923, dated May 8, 2019.
(Continued)

*Primary Examiner* — Shefali D Goradia
(74) *Attorney, Agent, or Firm* — Workman Nydegger

(57) ABSTRACT

A method of estimating weight of food objects, includes training an artificial neural network software module, and using the trained artificial neural network software module to provide a weight correlated data estimate for said food object based on a three-dimensional image of the food object.

19 Claims, 6 Drawing Sheets

(51) Int. Cl.
   *G06T 7/00*    (2017.01)
   *G06T 7/40*    (2017.01)
   *G06T 7/70*    (2017.01)
(52) U.S. Cl.
   CPC ............ *G06T 7/70* (2017.01); *G06T 2200/04* (2013.01); *G06T 2207/10028* (2013.01); *G06T 2207/20081* (2013.01); *G06T 2207/20084* (2013.01); *G06T 2207/30128* (2013.01)
(58) Field of Classification Search
   CPC . G06T 2207/10028; G06T 2207/20081; G06T 2207/20084; G06T 2207/30128; G06N 3/02
   See application file for complete search history.

(56) References Cited

U.S. PATENT DOCUMENTS

| | | | | |
|---|---|---|---|---|
| 2016/0140413 | A1* | 5/2016 | Maga | G01N 23/10 382/195 |
| 2019/0210067 | A1* | 7/2019 | Kumar | G06V 10/82 |
| 2020/0193112 | A1* | 6/2020 | Pang | G06K 7/1439 |

OTHER PUBLICATIONS

International Search Report and Written Opinion from PCT Application No. PCT/EP2019/084959, dated Feb. 12, 2020.

* cited by examiner

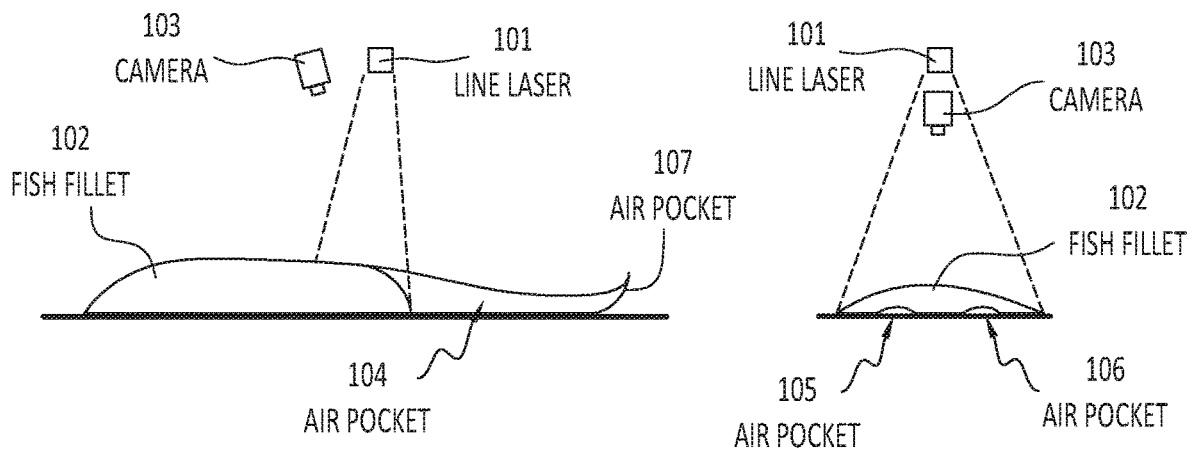
FIG. 1(b)
(PRIOR ART)
FIG. 1(b)
(PRIOR ART)
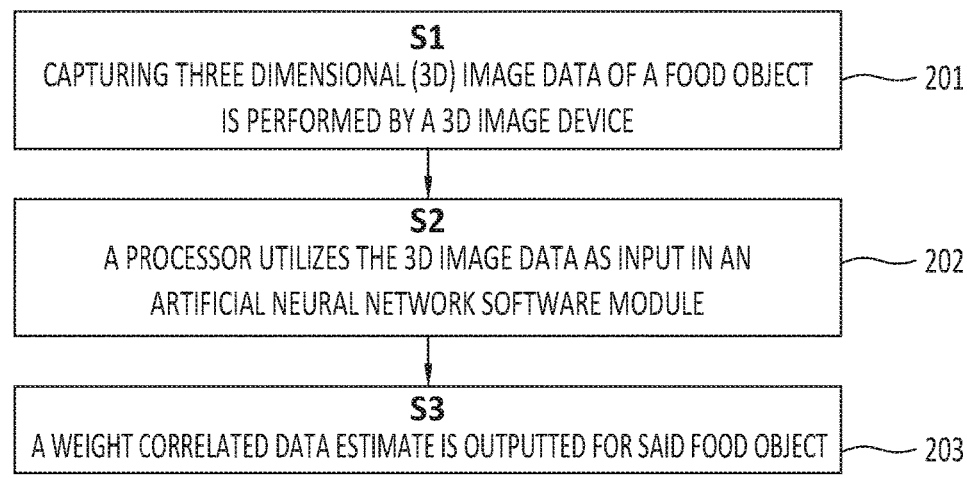
FIG. 2
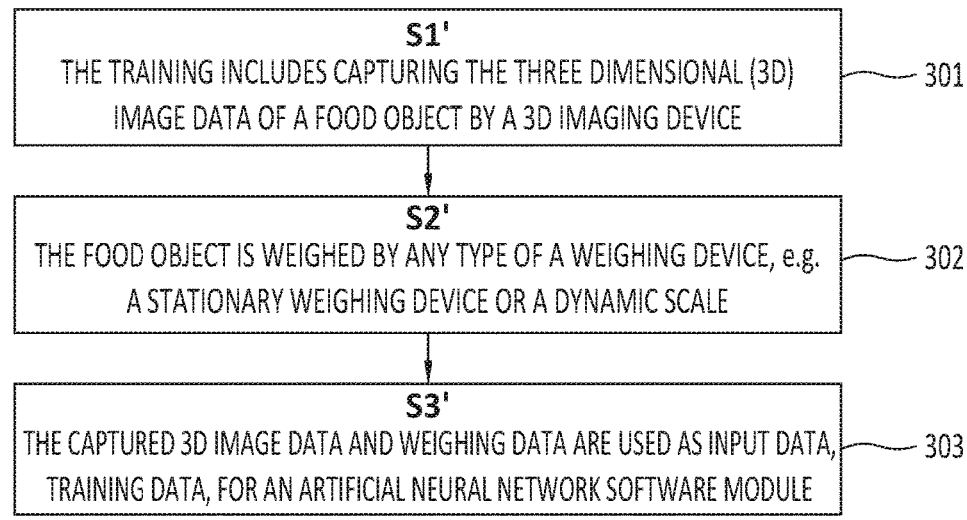
FIG. 3

|  | Mean | Standard deviation |
|---|---|---|
| Baseline | 0.3676 | 37.9759 |
| CNN model | -0.0117 | 21.2592 |

METHOD AND A DEVICE FOR ESTIMATING WEIGHT OF FOOD OBJECTS

INTRODUCTION

The present disclosure relates to a method and a device of estimating weight of food objects.

BACKGROUND

Food processing machines used e.g. to cut food objects into portions, e.g. fixed weight slices, use three dimensional (3D) surface profiles of the food objects as input in creating the cutting profiles for the food objects, or simply to evaluate the total weight of the food objects. This is commonly done using a line laser 101 as shown in FIGS. 1a-b that is positioned above an incoming food item, e.g. a fish fillet 102, where the reflection of the light from the surface of the food object is detected e.g. by a camera 103 and used to make the 3D surface profile which is utilized to calculate the volume of the food object. The density of the food objects must also be known in order to determine such cutting profiles, or the weight of the food objects. The density may be known from experience—or be known from a number of food objects acquired from calibrating the system, e.g. by scanning a number of food objects and then weighing them on a manual scale for obtaining the average density. Such 3D surface profiles may, however, in some cases be inaccurate because of "empty" areas or air-pockets which influence the volume of the food object but does not contribute to weight of the food objects. In FIGS. 1a-b, the air-pockets are illustrated with numbers 104-106. FIG. 1a shows a side view of a fish fillet and FIG. 1b shows a cross sectional view of the fish fillet in FIG. 1a. In FIG. 1a the tail part 107 of the fish fillet may in some cases be tipping up. The tipping may especially occur when the fish fillet is short meaning that the line laser does not capture illuminated area 104 and therefore the camera 103 will not capture it. The, resulting 3D image will indicate that this area is fish meat and not just air. In the cross sectional view of the fish fillet shown in FIG. 1b, it is common that empty spaces of air, i.e. air-pockets 105, 106 are formed between the fish fillet and the support surface because of the shape of the fish fillet. Thus, the 3D image will indicate that these areas 105, 106 are fish meat and not just air. All in all, the resulting 3D image will show a volume of a fish fillet which is larger than it actually is and thus the overall weight and/or the weight density will be inaccurate.

Also, when utilizing a 3D image in estimating weight of a food object, the weight is determined by multiplying the volume of the food object with the density of the food object, the assumption of fixed density is made. This assumption can however lead to additional inaccuracy because the density can vary—both from food object to food object, and also within the same food object. As an example, if the food object is a fish fillet, the density at the tail part is commonly different from the density at the head part.

SUMMARY

On the above background it is an object of embodiments of the present disclosure to improve the accuracy in weighing using 3D surface profiles. It is a further object to enable a more flexible and simple use of 3D imaging devices for determining weight of food objects.

In general, the disclosure preferably seeks to mitigate, alleviate or eliminate one or more of the above mentioned disadvantages of the prior art singly or in any combination.

In particular, it may be seen as an object of embodiments of the present disclosure to provide a method that solves the above mentioned problems, or other problems.

To better address one or more of these concerns, in a first aspect of the disclosure, a method is provided for estimating weights of food objects. The method comprises
providing a processor with an artificial neural network software module,
capturing three dimensional (3D) training image data and associated training weight data of a plurality of training food objects by use of a 3D imaging device and a scale,
training the artificial neural network software module by use of the image data and associated weight data,
capturing a three dimensional (3D) image of a food object by a 3D imaging device,
using the trained artificial neural network software module and the captured image to provide a weight correlated data estimate for said food object.

By training such an artificial neural network software module, the software learns to correlate specific shapes of food objects to specific characteristics of the food objects. As an example of such learning is that specific 3D shapes may indicate empty space between the food object and the surface on which it rests, while other 3D shapes may indicate that the food object is flat against the surface and therefore indicate no empty space. Another example may be that shorter food objects, e.g. a fish fillet, are more likely to have a specific part, e.g. the tail part of the fish fillet, lifted upwards. This typical characteristic implies an empty space between the tail and the surface, whereas a longer fish fillet is less disposed to form empty spaces. Yet another example, which will be discussed in more details later, is to take varying density into account, where the software may learn e.g. that the density at the tail part is larger than at the head part, and this difference may be taken into account when estimating the weight of the food object.

The step of capturing the 3D image data by said 3D imaging device may, in one embodiment, comprise using a digital camera, and/or a line laser positioned above an incoming food item, typically in an angular position relative to a vertical axis, where the reflection of the light from the surface of the food object may be captured by a detector, e.g. a camera, that outputs the 3D surface profile.

The food objects may include any type of food products, e.g. fish fillets, smoked fish fillets, meat/food products of e.g. fish, poultry, pork, or cattle, poultry products such as breast or legs or wings, slices or fillets of food products etc.

The training of the artificial neural network software module for said similar or identical food species as said food objects may involve scanning the first hundreds or thousands of similar or identical food species as said food objects to capture the 3D image data for each of them, weighing them, and associating the respective weight to the image data.

In one embodiment, the weight correlated data comprises a weight estimate. In this case, there is a single output indicating the weight estimate of the food object.

A salmon filet can have higher density in its tail than in the rest of the filet, and in general, variations between food objects or within one and the same food object may be important for the estimation of weight based on an image.

In one embodiment, the weight correlated data comprises a density estimate. From the weight density, the weight estimate may be calculated by multiplying the density with the measured volume. The artificial neural network software module may particularly be trained to identify different densities within the same food object and to use the different densities for determining the weight of the food object.

In an embodiment, the food object is a portion from a larger food object such that multiple of such portions define the whole larger food object. Such a larger food object can e.g. be a fish fillet, a meat product, etc. where density may vary along these larger food objects.

As an example, it is common that the density at the tail part of a fish fillet is different from the density at the head part. Same applies for meat products. Since the density of fat is lower than the density of meat, a varying fat content may cause a varying density. Accordingly, when a larger food object is received into e.g. a cutting device that scans such a larger food object, the density distribution for this particular larger food object can be taken into account when calculating a cutting profile to obtain fixed weight portions.

The artificial neural network software module may be trained to identify in the 3D image a non-uniform density of the food object, and it may be configured to determine the weight correlated data estimate based on the non-uniform density. As an example, the artificial neural network software module may identify a specific shape or pattern of shapes in the 3D image, e.g. a circular shape, an oval shape, an oblong shape, the shape of a tail, the shape of a head or similar characteristic shapes. For such characteristic shapes, the artificial neural network software module may be trained to account for different densities pertaining to the specific shape or pattern of shapes and which are typical for food objects having such a characteristic shape. The artificial neural network software module may use the shape identified in the 3D image and be trained to provide the density at least partly based on the shape.

In one example, the artificial neural network is configured for hamburgers, and during training of the network, the system will learn that a circular hamburger may have a density which is different from the density of less circular hamburgers, and the system will provide a better indication of the weight correlated data based on the shape. In another example, the above mentioned tail part of a salmon is identified with a different density compared to the head part or abdomen part of the salmon etc. and the non-uniform density of the salmon is taken into account when estimating the weight correlated data estimate.

The artificial neural network software module may be trained to determine a density at least partly based on a determined surface texture of the food object. As an example, it may be identified, that the food object has a rough surface, and the training may enable that such food objects are considered to have a density which is different from the density of a food object having a smoother surface.

The 3D image may be captured such that one or more air-pockets are included in the 3D image of the food object. Such air-pockets may be shadowed by said food object and thereby not be directly visible in the 3D image. In these situations, the artificial neural network software module may be trained to identify shapes where air-pockets are likely to exist and to compensate for such air-pockets when assigning a density to the food objects. By means of an example, if an air-pocket is present beneath a food object there may be a visible bulk on the food object over the air-pocket. The training may enable the artificial neural network software module to identify such situations.

If an air-pocket beneath a food object is to be captured visually by a camera, it would require the imaging device to capture the images sideways, or from below the food object. This complicates the device and the arrangement of the imaging device. Since the training of the artificial neural network software module is carried out to identify shadowed air-pockets, i.e. air-pockets which are not directly visible in the 3D-image, the image may be captured with less attention on specific and complicated arrangement of the imaging device. Accordingly, the image may be captured e.g. from above the food objects.

The 3D-image may be captured in a direction which is essentially perpendicular to a conveyor belt on which the food objects are supported.

The laser light source may be positioned e.g. next to the 3D imaging device. Both the laser light source and the 3D imaging device may be pointed downwards towards the food objects. This provides a simple setup and easy maintenance of the 3D imaging device as compared with devices arranged at different positions and angles circumferentially around the food object to directly image potential air-pockets.

In one embodiment, the step of training the artificial neural network software module includes the step of:
cutting said similar or identical larger food objects into smaller pieces,
acquiring a weight and a 3D image of each of the smaller pieces, and
associating the weight with the 3D image for each of smaller pieces.

Accordingly, an advantageous training process is provided to obtain the density of the smaller pieces to obtain a density distribution of the food objects where the variety in the density distribution may be taken into account when estimating the weight of said food object.

In one embodiment, when training the artificial neural network software module, each of said smaller pieces is associated with a position data indicating the position of the smaller food pieces within said similar or identical food species. It is thus ensured that the position of the associated weight and 3D image data for each of said smaller food pieces is known. Therefore, a density distribution of said food object may further be utilized to take variable densities into account when performing the weight estimate of the food object. As an example, if the food product is pork meat, e.g. a piece of a pork flank, the difference in density due to different lean/fat average ratio may be taken into account when estimating the weight of the piece of pork flank. Thereby, due to the additional position data, the training of the artificial neural network software module will be improved.

In one embodiment, when training the artificial neural network software module the 3D image of each of smaller pieces is determined before said cutting is performed. As an example, during the training process, hundreds or thousands similar or identical food species may be run through said line laser, or the device may be used to capture said 3D data, and based on this data the 3D image data may be utilized to determine the volume of each smaller food piece. In another embodiment, this 3D image may be captured after said cutting is performed.

In a second aspect, the disclosure provides a device for providing weight correlated data estimate for a food object, the device comprising:
a 3D imaging device configured to provide three dimensional (3D) image data of the food object
a processor configured with a trained artificial neural network software module configured to output the weight correlated data estimate for said food object based on the three dimensional image data, the artificial neural network software module being trained for similar or identical food species as said food object, where the training of the artificial neural network software module is based on collected 3D image data with associated weight data for said similar or identical food species.

The 3D imaging device may be positioned above the food object, and the device may, in one embodiment, comprise only one 3D imaging device.

The position of the 3D imaging device may be arranged such that air-pocket can be shadowed by the food object and therefore contribute to the volume of the captured 3D image, and where the artificial neural network is trained to identify such air-pockets and take them into account when determining a density and thus the weight correlated data estimate.

BRIEF DESCRIPTION OF THE DRAWINGS

Embodiments will be described, by way of example only, with reference to the drawings, in which FIGS. 1a and 1b illustrate graphically a prior art method of obtaining a 3D image profile of a food object to be used as input for estimating the weight of the food object, FIG. 2 shows a flowchart of one embodiment of a method according to the present disclosure for estimating weights of food objects, FIG. 3 shows a flowchart of one embodiment of training the artificial neural network software module.

DESCRIPTION OF EMBODIMENTS

FIG. 2 shows a flowchart of one embodiment of a method according to the present disclosure for estimating weights of food objects. The food objects may according to the present disclosure be understood as any type of food objects, such as but not limited to, whole fish objects or pieces of fish objects, whole meat objects such as loin or pieces of meat such as pieces of loin, whole poultry objects or pieces of poultry objects etc..

In step (S1) 201, capturing three dimensional (3D) image data of a food object is performed by a 3D imaging device. The 3D imaging device may comprise a digital camera, a combination of a line laser pointed towards the food object and a camera, where the reflection of light from the surface of the food object is detected by the camera, and where based thereon a 3D profile is created of the food object.

In step (S2) 202, a processor utilizes the captured 3D image data as input in an artificial neural network software module. As will be discussed in more details later, the artificial neural network software module has previously been trained for similar or identical food species as said food objects based on collected 3D image data with associated weight data for said similar or identical food species.

In step (S3) 203, a weight correlated data estimate is outputted for said food object. The term weight correlated data may be interpreted as the actual weight estimate in grams or kilograms, or the estimate may be the density estimate.

FIG. 3 shows a flowchart of one embodiment of training the artificial neural network software module in estimating a weight of a food object.

In step (S1') 301 the training includes capturing three dimensional (3D) image data of a food object by a 3D imaging device, which can be any kind of imaging device, a camera, line scanner etc..

In step (S2') 302 the food object is weighed by any type of a weighing device, e.g. a stationary weighing device or a dynamic scale.

In step (S3'), 303 the captured 3D image data and the weighing data are used as input data, training data, for an artificial neural network software module.

Steps S1' to S2' are then repeated for thousands, hundreds of thousands of objects where the data is stored.

S3' is the training step, which is repeated hundreds of thousands or millions of times based on the stored data. After the training, the software module can make highly accurate weight estimates.

Figure 4:
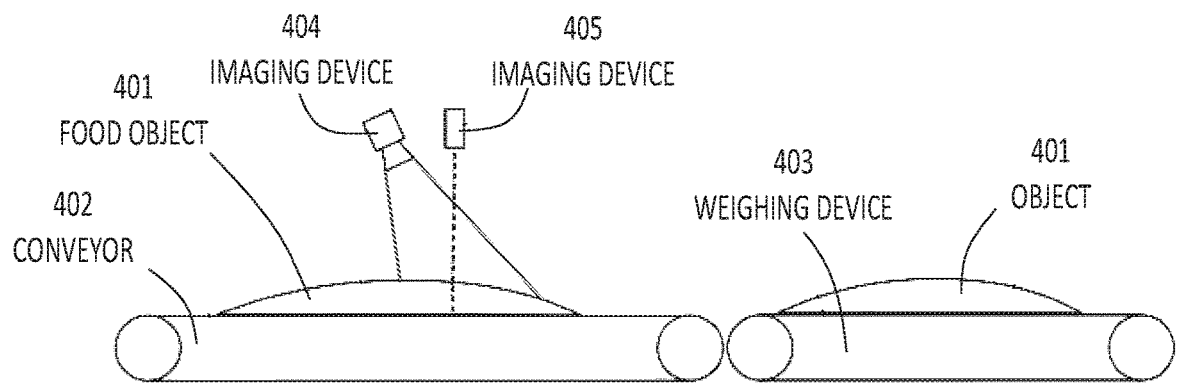
FIGS. 4 and 5 illustrate graphically a training setup discussed in relation to the flowchart in FIG. 3.
Figure 5:
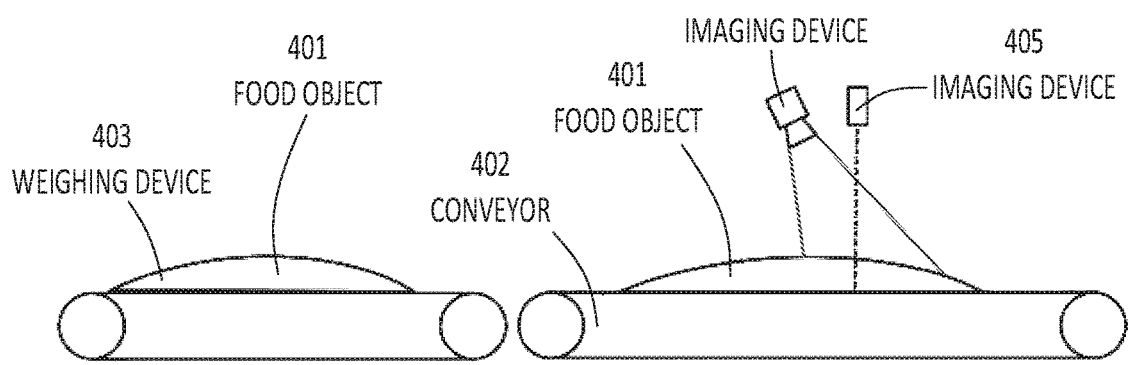

The method steps in the flowchart in FIG. 3 are illustrated graphically in FIGS. 4 and 5, where FIG. 4 shows where a food object 401 is e.g. being conveyed by a conveyor 402 and passes a 3D imaging device 404, 405 which may comprise a line scanner and a camera, where the camera captures the reflected light emitted by the line scanner from the object and towards the camera, and where, based thereon, a processor generates the 3D profile image. The object 401 is subsequently weighed by a weighing device 403, and these data are, as discussed, used as data for the training of the artificial neural network software module.

FIG. 5 depicts the exact same scenario as shown in FIG. 4, but where the order is reversed, i.e. the object is first weighed, and the 3D profile image is captured subsequently.

Figure 6:
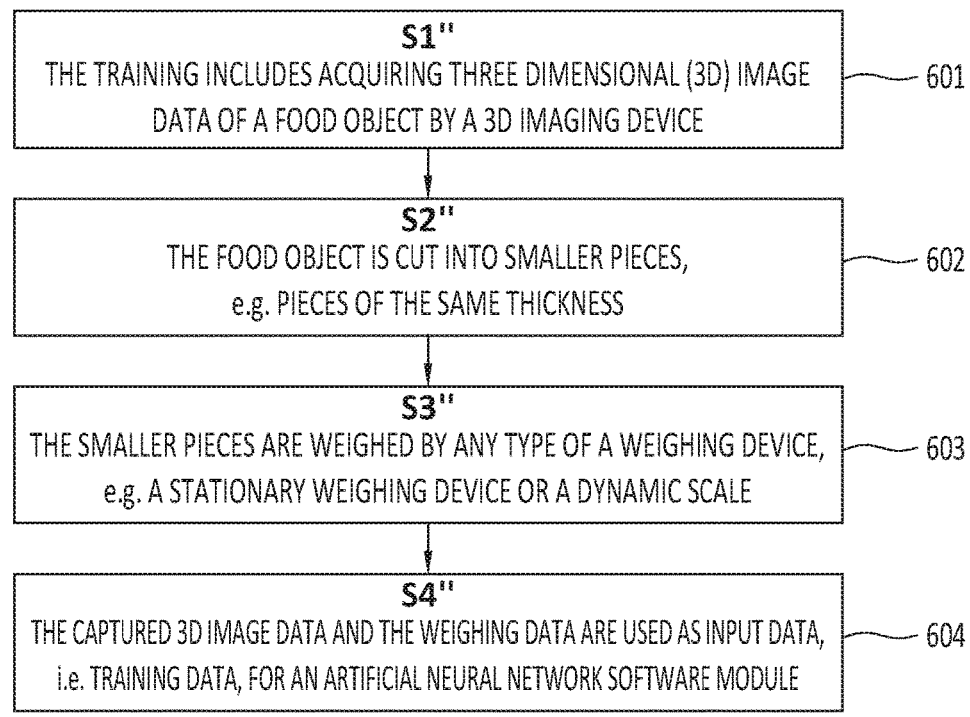
FIG. 6 is a flowchart of another embodiment for training the artificial neural network software module.

FIG. 6 depicts in a flowchart another embodiment of training the artificial neural network software module in estimating a weight and/or weight density distribution of an object.

In step (S1") 601, the training includes acquiring three dimensional (3D) image data of a food object by a 3D imaging device, which can be any kind of imaging device, a camera, a line scanner etc..

In step (S2") 602, the food object is cut into smaller pieces, e.g. pieces of the same thickness.

In step (S3"), 603 the smaller pieces are weighed by any type of a weighing device, e.g. a stationary weighing device or a dynamic scale.

In step (S4") 604, the captured 3D image data and the weighing data are used as input data, i.e. training data, for an artificial neural network software module.

Steps S1" to S3'" are repeated for hundreds or thousands of objects and stored. Step S4" is the training step, which is repeated hundreds of thousands or millions of times based on the stored data. After the training, the software module can make highly accurate density distribution for such food objects, and thereby highly accurate weight estimate.

Figure 7:
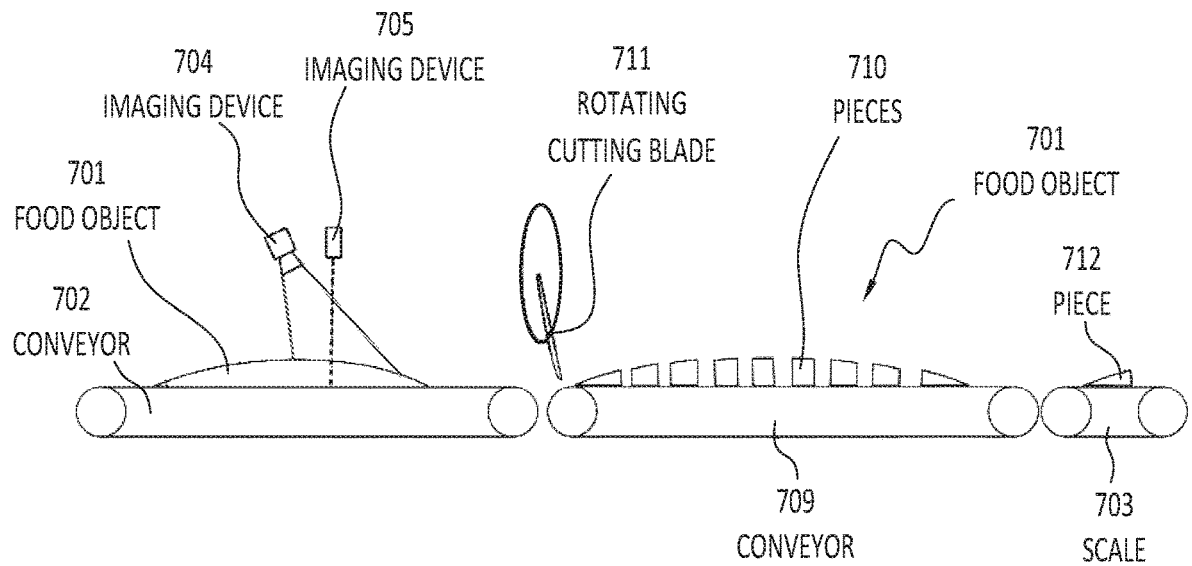
FIG. 7 illustrates graphically a training setup discussed in relation to the flowchart in FIG. 6.

The flowchart in FIG. 6 is illustrated graphically in FIG. 7, showing where a food object 701 is conveyed by a conveyor 702 and passes a 3D imaging device 704, 705 which may comprise a line scanner and a camera. The camera captures the reflected light emitted by the line scanner from the object and towards the camera, and based thereon, a processor generates the 3D profile image. The object 701 is subsequently cut into pieces 710 which may e.g. be done by a rotating cutting blade 711 using the 3D image as input data, where the cutting may include cutting the food object into pieces of identical thickness. Other criteria may also be implemented.

Conveyor 709 conveys individual piece to a scale 703 where each piece 712 is weighed. Accordingly, the input data into the artificial neural network includes the 3D image of each individual piece and the associated weight. Additional input data may be position data indicating the position of the individual piece within the object 701.

Figure 8:
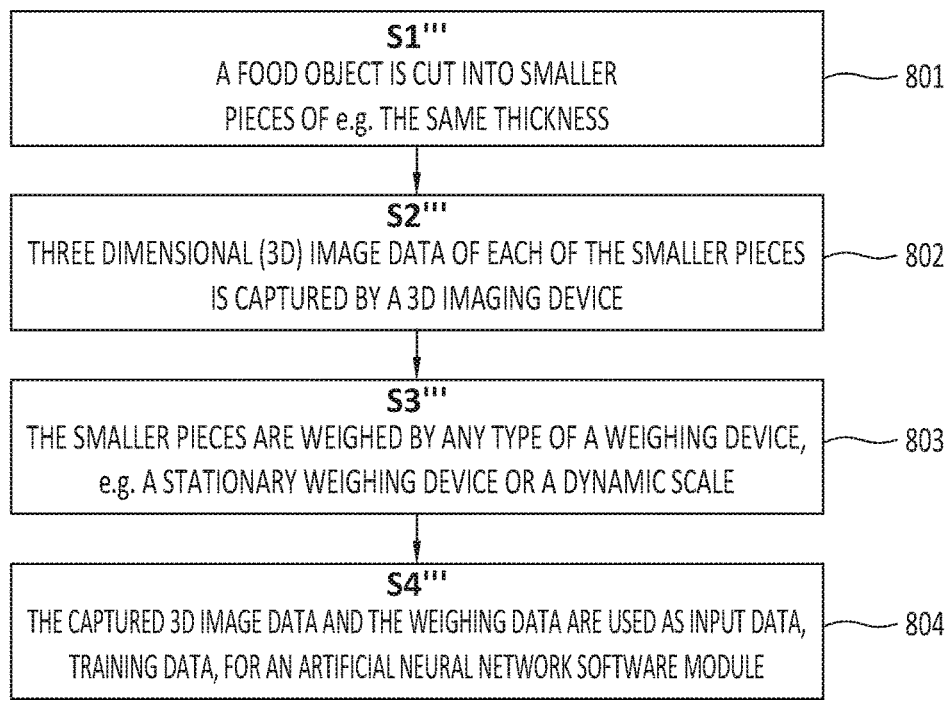
FIG. 8 is a flowchart of yet another embodiment for training the artificial neural network software module.

FIG. 8 depicts by a flowchart another embodiment of training the artificial neural network software module in estimating a weight and/or weight density distribution of an object.

In step (S1''') 801, a food object is cut into smaller pieces of e.g. the same thickness.

In step (S2''') 802, three dimensional (3D) image data of each of the smaller pieces is captured by a 3D imaging device, which can be any kind of imaging device, a camera, line scanner etc..

In step (S3''') 803, the smaller pieces are weighed by any type of a weighing device, e.g. a stationary weighing device or a dynamic scale.

In step (S4''') 804, the captured 3D image data and the weighing data are used as input data, training data, for an artificial neural network software module.

Steps S2''' and S3''' may just as well be reversed, i.e. S3''' may be performed prior to step S2'''.

Steps S1''' to S3''' are repeated for hundreds or thousands of objects and stored. Step S4''' is the training step, which is repeated hundreds of thousands or millions of times based on the stored data.

Figure 9:
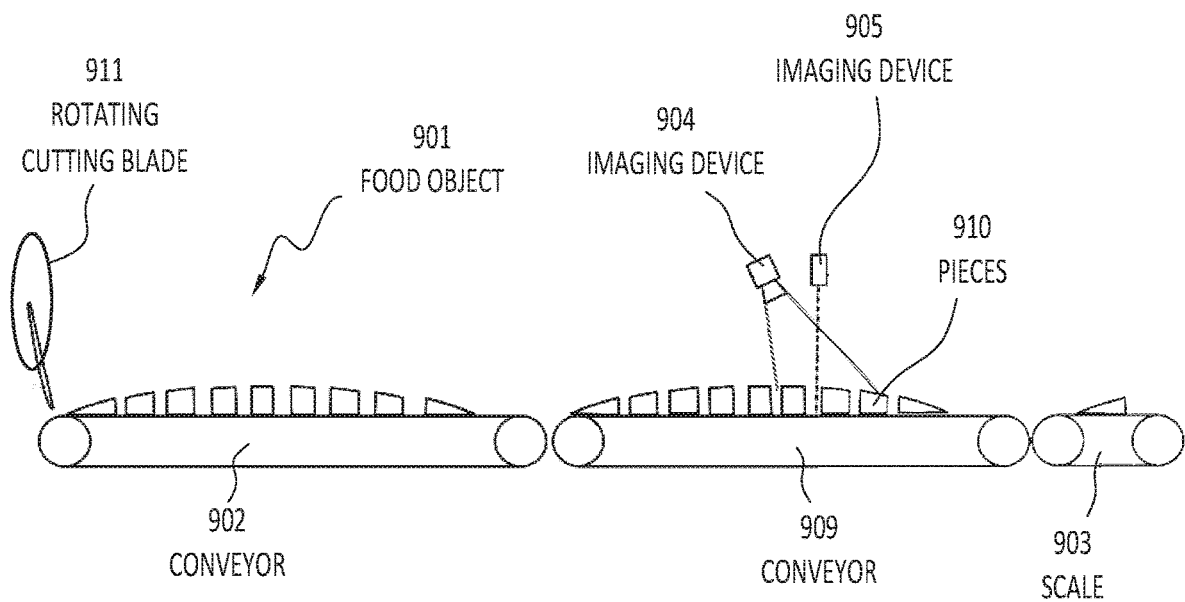
FIGS. 9 and 10 illustrate graphically a training setup discussed in relation to the flowchart in FIG. 8.
Figure 10:
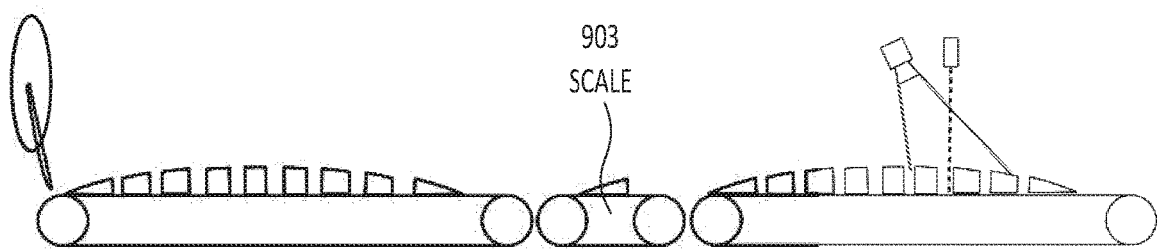

The flowchart in FIG. 8 is illustrated graphically in FIGS. 9 and 10, showing where a food object 901 is cut into pieces 910, which may e.g. be done by a rotating cutting blade 911, where the pieces may have identical thickness (other criteria may just as well be implemented).

In FIG. 9, the cut pieces pass a 3D imaging device 904, 905 positioned above conveyor 909, where the imaging device comprise a line scanner and a camera, where the camera captures the reflected light emitted by the line scanner from the pieces and towards the camera, and based thereon, a processor generates the 3D profile image of individual pieces. Conveyor 909, e.g. the same conveyor as 902, then conveys individual piece to a scale 903 where each piece is weighed.

The same scenario is shown in FIG. 10 except where the weighing 903 takes place before the 3D profile image of individual pieces is generated.

Figure 11:
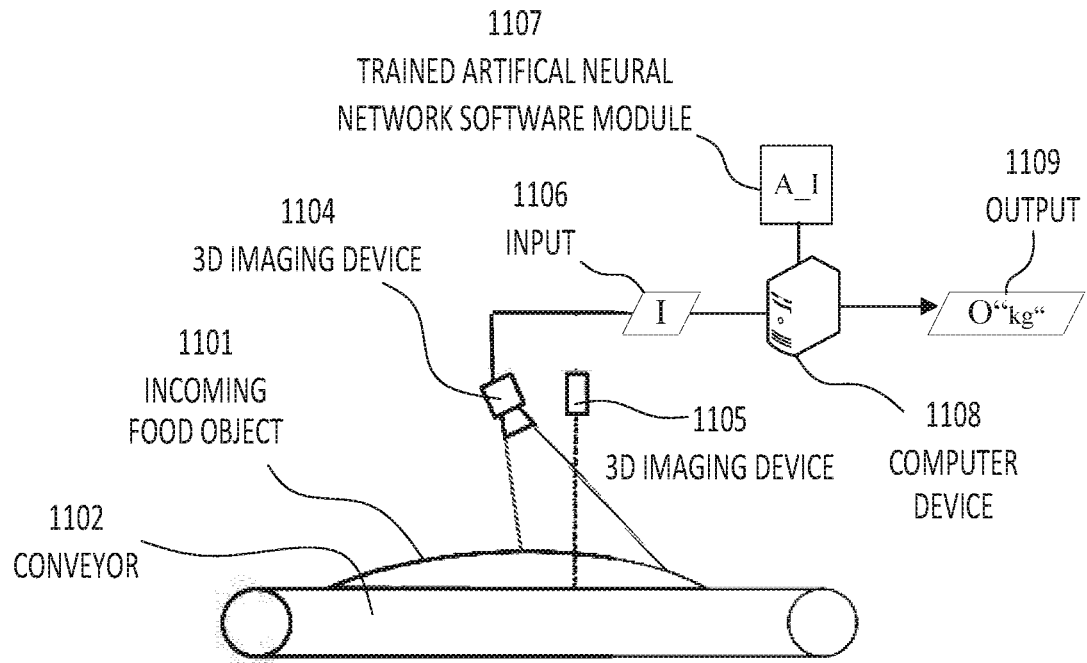
FIG. 11 illustrates graphically an implementation of the method according to the present disclosure to weigh an object.

FIG. 11 illustrates graphically an implementation of the method according to the present disclosure in estimating the weight of an incoming food object 1101. As shown here, the object is conveyed by a conveyor 1102, and passes the 3D imaging device 1104, 1105, where the resulting 3D profile image is used as an input 1106 in the trained artificial neural network software module 1107 operated via a computer device 1108, where the training has been performed in line with the method discussed previously. The output 1109 is the weight estimate or the density estimate of the food object.

Figure 12:
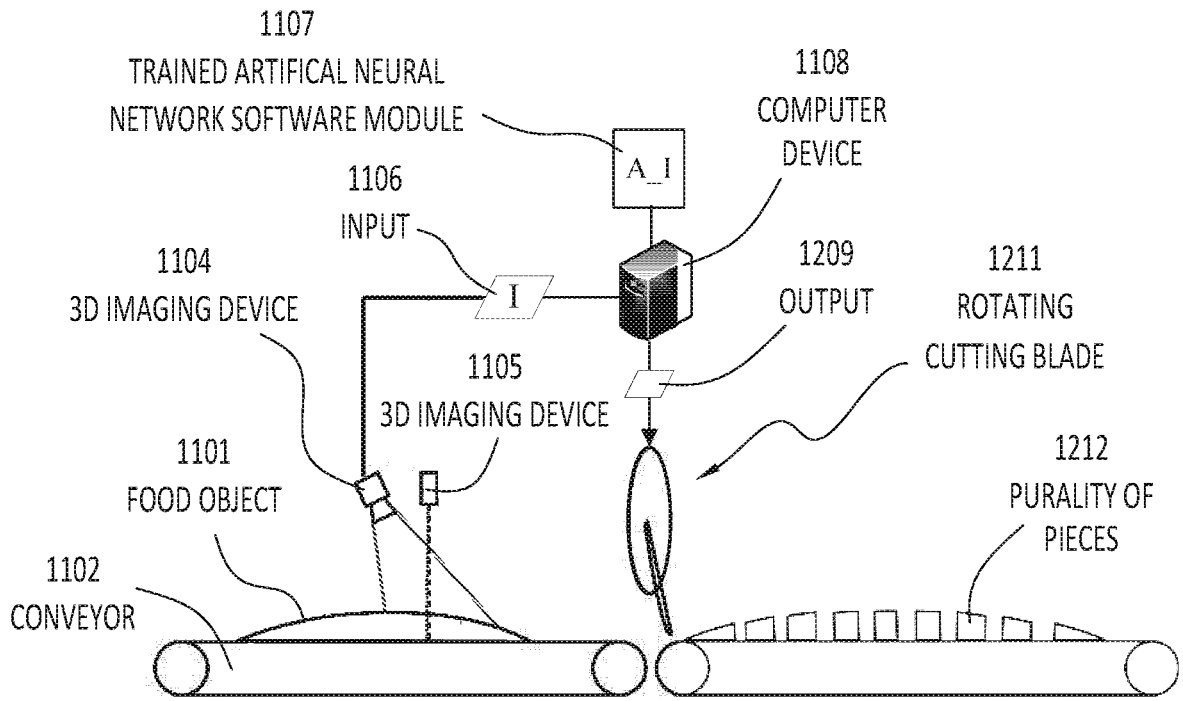
FIG. 12 illustrates graphically an implementation of the method according to the present disclosure in cutting a food object into smaller pieces.

FIG. 12 illustrates graphically an embodiment similar to the embodiment shown in FIG. 11 and showing where the incoming food object 1101 is conveyed by the conveyor 1102, and passes the 3D imaging device 1104, 1105. The resulting 3D profile image is used as an input 1106 in the well trained artificial neural network software module 1107 operated via the computer device 1108, where the training has been performed as discussed previously.

In this embodiment, the output 1209 is then used to operate a cutting device 1211 to cut the food object into a plurality of pieces 1212 which may e.g. be portions of fixed weight. In this process parameters like differences in the density along the food object is taken into account.

Figures 13, 14:
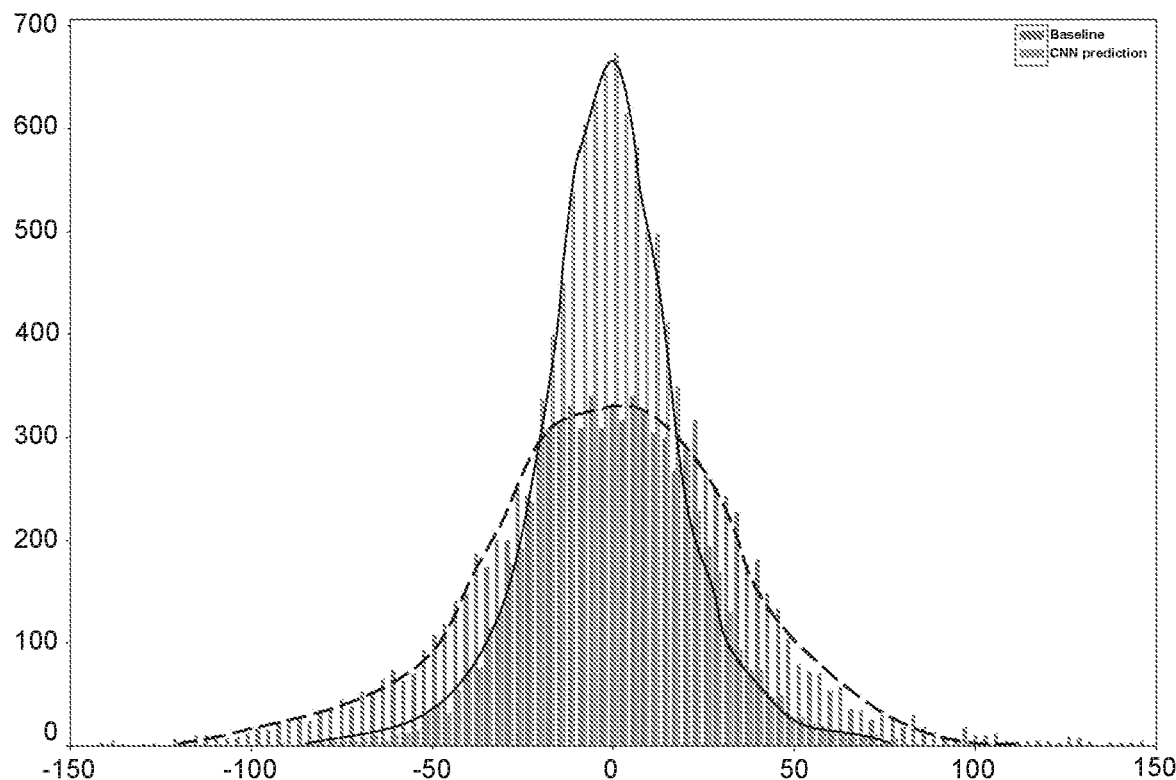
FIGS. 13 and 14 show experimental results of the method according to the present disclosure.

FIG. 13 shows experimental histogram results of around 10.000 food object samples used as training data in training the artificial neural network software module, which may also be referred to as "the model". The distribution indicated by the dotted line are results based on weight estimate of the fish fillets using only 3D image data (prior art), where the reference is the actual weight of the fish fillets. The distribution indicated by the solid line is however the weight estimates using the trained artificial neural network software module and using the actual weight as reference. When looking at the results it is clear that the artificial neural network software module gives significant better weight predictions than in the absence of the artificial neural network software module.

The table in FIG. 14 shows the mean and the standard deviation of the 10.000 test samples from both the artificial neural network software module, referred to as CNN model, and in the absence of the module, referred to as "Baseline". It can be seen that the artificial neural network software module's standard deviation is a reduction of approximately 44% compared to the weighing using only the 3D profile. As is well known to a skilled person in the art, artificial neural network software module is in a way a black box, due to the very large number of parameters, which are fitted to map the relationship between the input and output. Therefore, it is hard to define, which feature in the input image that has a large meaning in relation to the output weight. However, there are some ideas of what the model is able to extract from the image. One factor, when the input data relates to fish fillets, might be a generalized fillet shape, which would reduce the effect of missing areas of information in the scan. A different factor might be that the model has generalized different densities to different areas of the fillet, which e.g. could be a higher density in the tail region, compared to the head region.

While the disclosure has been illustrated and described in detail in the drawings and foregoing description, such illustration and description are to be considered illustrative or exemplary and not restrictive; the disclosure is not limited to the disclosed embodiments. Other variations to the disclosed embodiments can be understood and effected by those skilled in the art in practicing the claimed disclosure, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The disclosure further provides the following numbered embodiments:

1. A method of estimating weights of food objects, comprising:
    capturing three dimensional (3D) image data of a food object by a 3D imaging device, utilizing, by a processor, the captured 3D image data as input in an artificial neural network software module, the artificial neural network software module previously being trained for similar or identical food species as said food objects, where the training of the artificial neural network software module is based on collected 3D image data with associated weight data for said similar or identical food species, and based thereon outputting a weight correlated data estimate for said food object.

2. The method according to embodiment 1, wherein the weight correlated data comprises a weight estimate.

3. The method according to embodiment 1, wherein the weight correlated data comprises a density estimate.

4. The method according to any proceeding embodiments, wherein the food object is a portion from a larger food object such that multiple of such portions define the whole larger food object.

5. The method according to any of the preceding embodiments, wherein the step of training the artificial neural network software module includes the step of:
cutting said similar or identical food species into smaller pieces, and
acquiring weight of each of the smaller pieces, and
associating the weight with the volume for each of smaller pieces.

6. The method according to embodiment 5, wherein each of said smaller pieces is associated with a position data indicating the position of the smaller food pieces within said similar or identical food species.

7. The method according to any of the preceding embodiments, wherein the volume of each of the smaller pieces is determined before said cutting is performed.

8. The method according to any of the preceding embodiments, wherein the volume of each of the smaller pieces is captured after said cutting is performed.

The invention claimed is:

1. A method of estimating weight of food objects, comprising:
providing a processor with an artificial neural network software module,
capturing three-dimensional (3D) training image data and associated training weight data of a plurality of training food objects by use of a 3D imaging device and a scale,
training the artificial neural network software module by use of the training image data and associated weight data, and with the use of the trained artificial neural network software module:
capturing a three-dimensional (3D) image of a food object by a 3D imaging device, and
using the trained artificial neural network software module and the captured 3D image to provide a weight correlated data estimate for said food object;
wherein the artificial neural network software module is trained to compensate for one or more air-pockets shadowed by said food object, the shadowed one or more air-pockets not being visible in the 3D image, by using visible shape of said food objects.

2. The method according to claim 1, wherein the food object has a non-uniform density, and wherein the artificial neural network software module is trained to identify the non-uniform density and to provide the weight correlated data estimate based on the non-uniform density.

3. The method according to claim 1, wherein the artificial neural network software module is trained to identify a characteristic shape in the 3D image, and determine the weight correlated data estimate based on the determined shape.

4. The method according to claim 1, wherein the artificial neural network software module is trained to identify a characteristic surface texture in the 3D image, and determine the weight correlated data estimate based on the surface texture.

5. The method according to claim 1, wherein the 3D-image is captured from above the food objects.

6. The method according to claim 5, wherein the 3D-image is captured in a direction which is essentially perpendicular to a conveyor belt on which the food objects are supported.

7. The method according to claim 1, wherein the image is captured by use of light from a laser light source, and
wherein both the laser light source and the 3D imaging device is pointed downwards towards the food objects.

8. The method according to claim 1, wherein the weight correlated data comprises a weight estimate.

9. The method according to claim 1, wherein the weight correlated data comprises a density estimate for the food object.

10. The method according to claim 1, comprising a step of portioning a larger food object to thereby define a plurality of food object, and subsequently capturing the three-dimensional (3D) image of each food object by a 3D imaging device, and using the trained artificial neural network software module and the captured 3D image to provide a weight correlated data estimate for each food object.

11. The method according to claim 10, wherein each of said plurality of food objects is associated with position data indicating the position of the food objects within said larger food object.

12. The method according to claim 1, comprising a step of capturing the three-dimensional (3D) image of a larger food object by a 3D imaging device, and using the trained artificial neural network software module and the captured 3D image to provide a weight correlated data estimate for the larger food object and subsequently portioning the larger food object to thereby define a plurality of food object.

13. The method of claim 12, wherein the portioning of the larger food object is carried out with a weight consideration for each of the plurality of food objects, the weight consideration being based on the weight correlated data estimate for the larger food object.

14. The method according to claim 1, wherein the step of training the artificial neural network software module includes the step of:
portioning a larger food object to thereby define a plurality of food objects,
acquiring a weight and a 3D image of each of the plurality of food objects, and
associating the weight with the 3D image for each of smaller food objects in the artificial neural network software module.

15. The method according to claim 1, wherein the 3D image of each of the food objects is captured before portioning is performed.

16. The method according to claim 1, wherein the 3D image of each food object is captured after portioning is performed.

17. A device for providing a weight correlated data estimate for a food object, the device comprising:
a 3D imaging device configured to provide three-dimensional (3D) image data of the food object,
a processor configured with an artificial neural network software module configured to output the weight correlated data estimate for said food object based on the three-dimensional image data, the artificial neural network software module being a trained software module, where the training of the artificial neural network software module is based on collected 3D image data with associated weight data for similar or identical food species;

wherein the 3D imaging device is positioned such that one or more air-pockets are arranged to be shadowed by the food object, and wherein the artificial neural network is trained to identify the one or more air-pockets and consider the one or more air-pockets when determining a density and the weight correlated data estimate.

18. The device according to claim 17, comprising a 3D imaging device positioned above the food object.

19. The device according to claim 17, comprising only one 3D imaging device.

* * * * *